April 15, 1941.                M. W. ANTHONY                2,238,208
                                MOTORCYCLE
                           Filed July 22, 1938           2 Sheets-Sheet 1

Mark W. Anthony INVENTOR
BY Victor J. Evans & Co.
ATTORNEYS

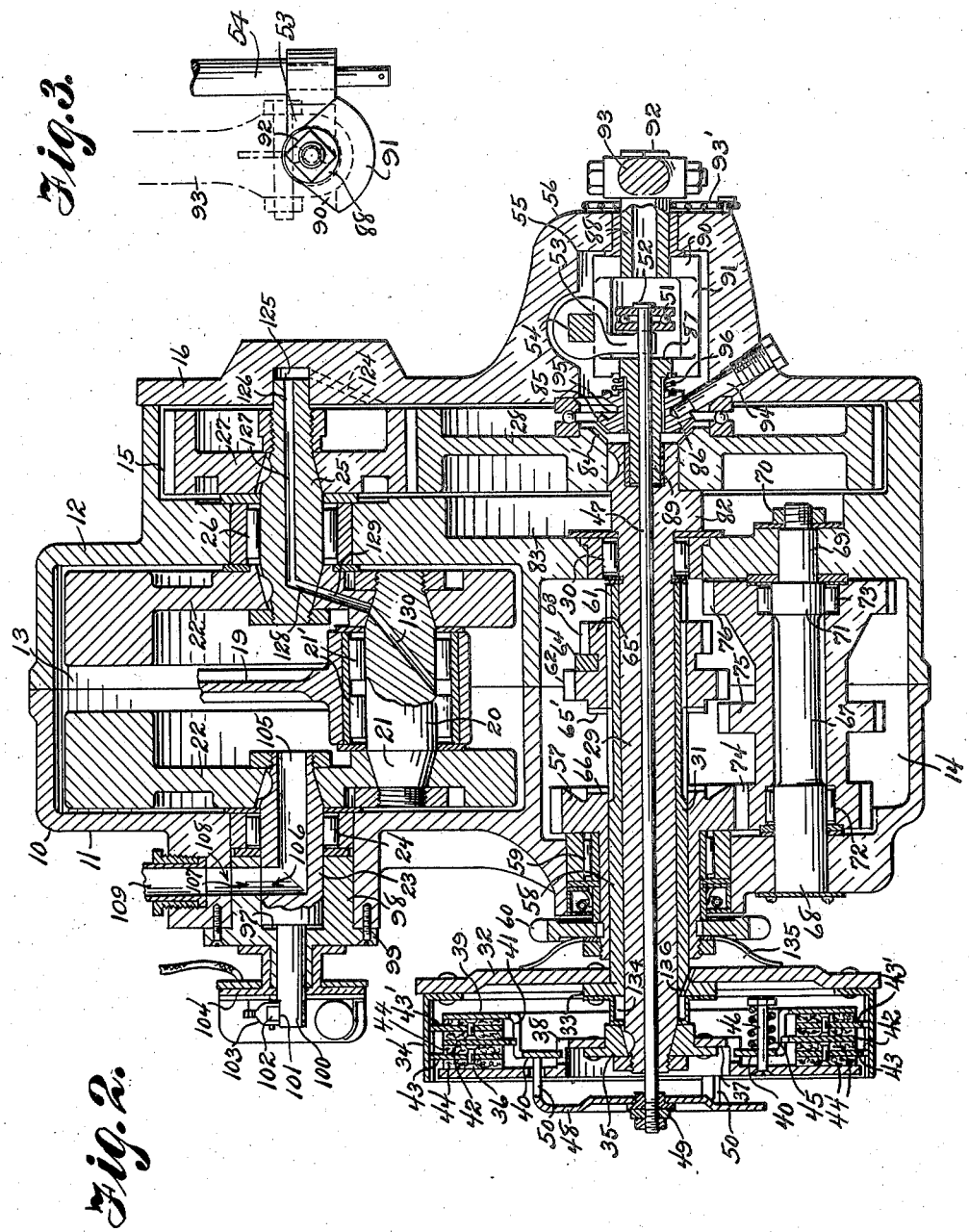

Patented Apr. 15, 1941

2,238,208

UNITED STATES PATENT OFFICE 2,238,208

MOTORCYCLE

Mark W. Anthony, Tyler, Tex.

Application July 22, 1938, Serial No. 220,790

3 Claims. (Cl. 74—333)

This invention relates to power means and more particularly to such for driving motorcycles.

The invention has for its principal object to produce a simple, compact and light-weight power unit, self-contained in character and which may be installed practically and with high efficiency in a motorcycle assembly.

A particular object is to coordinate in a self-contained unit the several motor starting, power transmission, lubricating and breather elements and to utilize some of the same elements in performing these several functions so as to minimize and greatly reduce a number of parts as compared to the provision heretofore made for performing the respective functions.

Other objects and advantages to be attained will hereinafter more fully appear.

The invention consists in the novel general structure and assembly, and in the particular parts and combinations and arrangements of parts thereof, as hereafter described and set forth in the appended claims, reference being had to the accompanying drawings illustrating a practical adaptation of the invention, and in which Figure 1 is a view principally in side elevation with a near side wall section removed to expose particular gear elements;

Figure 2 is a cross-sectional view; and

Figure 3 is a view illustrating details of a part of the motor starting means.

Figure 1:
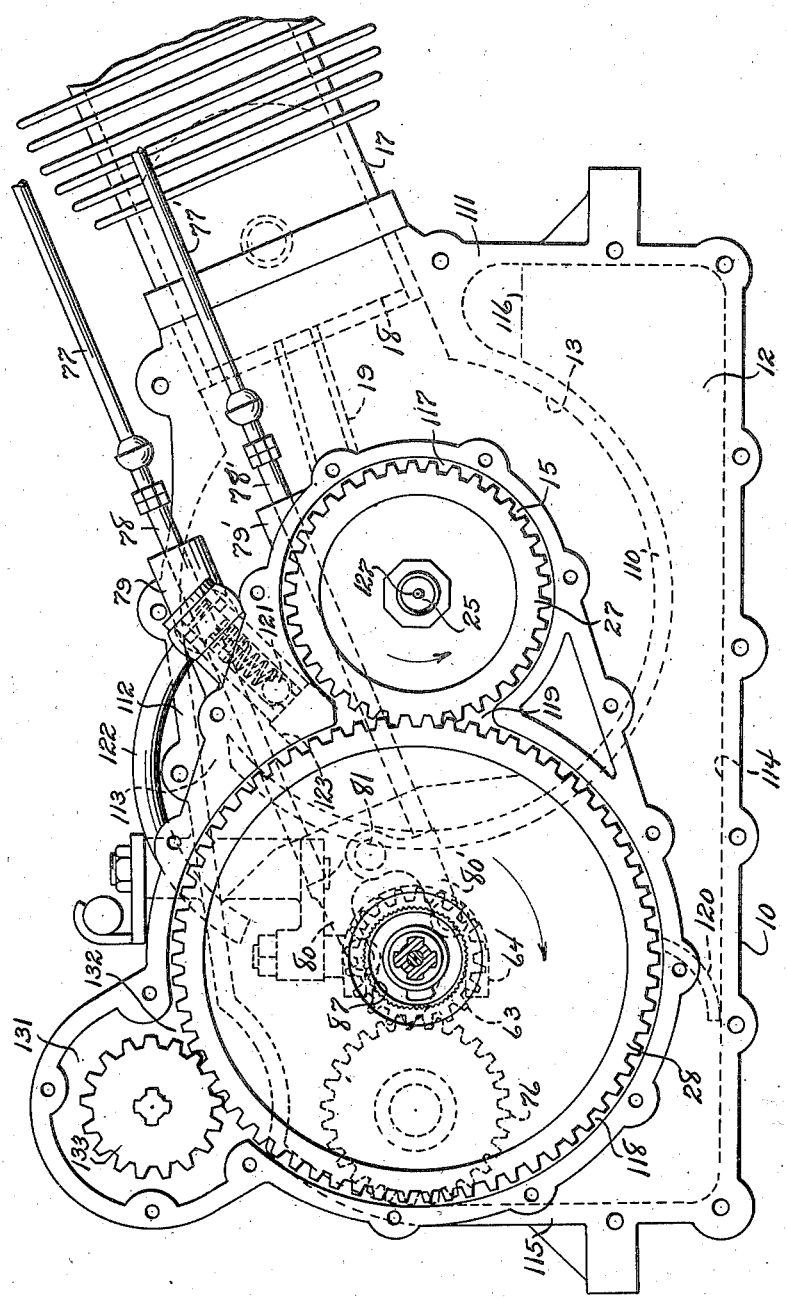

Referring now to the drawings, the numeral 10 designates generally the casing which houses the crank and fly wheel elements, primary driving gears, and the transmission gearing. As shown, the casing comprises two separable sections 11 and 12 and it is divided into two separate chambers, one of said chambers, designated by the numeral 13, constituting the crank and fly wheel chamber, and the other chamber 14 constituting the transmission chamber. The section 12 is formed with a primary driving gear chamber 15 which is closed by an end plate 16. Mounted on the casing 10 is the power cylinder 17, a fragmentary portion of which is shown in Figure 1, this cylinder being of the conventional air-cooled type.

The power cylinder 17 communicates at its inner end directly with the chamber 13, its piston 18 being connected by the pitman 19, which latter is in turn connected to the crank element 20 by means of the roller bearing 21'.

The opposite ends of the crank element 20 are tapered, as at 21, and secured in counterpart openings provided therefor in opposed fly wheel members 22.

The shaft 23 of one of the fly wheel members 22 is journaled in a roller bearing 24 provided therefor in the adjacent wall portion of the casing section 11, while the shaft 25 of the opposite fly wheel member is journaled in a roller bearing 26 provided in the adjacent wall portion of the casing section 12. The inner end portions of the shafts 23 and 25 are tapered and keyed in counterpart openings provided therefor in the respective fly wheel members 22.

Keyed on the fly wheel shaft 25 is a gear 27 which meshes with a larger gear 28 keyed on the end portion of a transmission shaft 29, said gears 27 and 28 constituting the primary driving gears. As shown, the transmission shaft 29 is journaled near the gear 28 in a roller bearing 30 provided in the adjacent wall portion of the casing section 12, said shaft extending through the bore in a tubular spline shaft 31.

Normally, said transmission shaft 29 and spline shaft 31 are connected by a clutch device so as to rotate the one by and with the other. As shown in Figure 2, the clutch comprises a circular plate 32 which is riveted or otherwise secured to a collar 33 provided on the outer end of the spline shaft 31, said plate 32 having a cylindrical drum 34 attached to its outer face near its periphery. Keyed on the outer end portion of the transmission shaft 29, in opposed relation to the collar 33 on the spline shaft 31, is a hub member 35 which carries a supporting plate 36. This plate 36 is formed with an inwardly offset central portion 37 which is provided circumferentially with longitudinal keyways 38 to receive corresponding lugs provided about the central opening of a spring-pressed clamping plate 39. Said plate 39 is formed with an outwardly offset central portion 40 on the circumference of which keyways 41 are formed similar to the keyways 38 on the supporting plate 36 and having in slidable key engagement therewith an intermediate ring 42 which is rotatable with the member 39 but permitted independent endwise movement thereon.

Interposed between the supporting plate 36 and said intermediate ring member 42 is a clutch ring 43 which is provided on its opposite faces with friction rings 44 of suitable material, and a similar ring 43' being interposed between said intermediate ring 42 and clamping ring 39, by which provision ample frictional contact is established between the parts to effect a driving connection between the two shafts 29 and 31 when said clamping plate 39 is urged towards the plate 36.

by the spring elements 45, of which latter there is a plurality sleeved on supporting studs 46 between said ring member and retaining nuts provided on the inner ends of said studs, the studs being inserted through apertures provided therefor in the supporting plate 36 and extending through aligned apertures provided in the offset central portion 40 of said plate 39.

For disengaging the clutch elements to permit independent rotation of the transmission shaft 29 and the spline shaft 31, the shaft 29 is provided with an axial bore through which a rod 47 extends, said rod being attached at its outer end to a spider frame 48, as at 49. Said spider frame 48 is provided at its marginal portions with inwardly extending right-angular legs 50 which work through apertures provided therefor in the supporting plate 36 with their inner ends abutting the outwardly offset central portion 40 of the clamping plate 39, by which provision, when the rod 47 is moved longitudinally in the direction towards its opposite end, the clamping plate 39 is moved in the direction away from the plate 36 so that the respective clutch elements are relieved of their braking effect. At the end of the rod 47 opposite to that on which the spider frame 48 is mounted, an anti-friction thrust collar 51 is provided, said collar abutting a retaining head 52 formed integrally or otherwise provided on the end of the rod. Cooperatively opposed to the thrust collar 51 is a lever member 53 mounted on a shaft 54 which is obviously extended to a convenient position (not shown) within reach of an operator. As shown, this lever member 53 and thrust collar 51 on the shaft 47 are located within a chamber 55 provided in a lateral extension 56 of the end closure 16 of the casing section 12.

The variable speed gearing of the transmission mechanism will now be described. As shown, a gear 57 is sleeved to rotate freely on the tubular spline shaft 31, said gear 57 having an elongated hub portion 58 which is rotatably mounted adjacent its body portion in a roller bearing 59 located in the adjacent wall portion of the casing section 11, said hub portion 58 extending outside of the casing and terminating near the clutch plate 32 on the tubular spline shaft 31. Keyed on the hub portion 58 is sprocket wheel 60 which, in practice, is connected by the usual driving chain (not shown) to the driven sprocket wheel which is regularly applied to the driving ground wheel of the motorcycle.

Keyed to slide longitudinally in the grooves 61 of the spline shaft 31, but rotatable with the shaft, is a double gear element 65 having a toothed circumferential portion 62 of a given diameter and another similarly toothed portion 63 of smaller diameter, said element being provided with an annular groove for the engagement of a shifter fork, a portion of which latter is shown conventionally, as at 64, in Figure 2 of the drawings, said fork, in practice, being obviously actuated by a gear shift lever (not shown). As shown, the shiftable double gear element is provided at one end with a plurality of clutch teeth 65' to engage similar teeth 66 on the adjacent end of the gear 57 whereby the gear 57 is rotated directly with the spline shaft 31, at which time and with the hereinbefore described clutch elements between the shafts 29 and 31 engaged, the vehicle is driven at third and high speed. For driving the gear 57 at first or low speed and at second or intermediate speed, a counter-shaft 67 is provided, said shaft 67 having a cylindrical enlargement 68 at one end which is fitted in an opening provided therefor in the adjacent wall portion of the casing section 11, the opposite end portion of the shaft being reduced, as at 69, and fitted in an opening provided in the adjacent wall portion of the casing section 12 where it is held fast by a nut 70 provided on a further reduced and screw-threaded portion of the shaft whereby to engage the outer face of the wall casing and draw an enlargement 71 of the shaft tight against the inner face of the wall.

Rotatable on roller bearings 72 and 73, respectively, provided on the shaft portions 68 and 71, is a triple idler gear having a toothed circumferential portion 74 constantly in mesh with the gear 57 on the spline shaft 31, said triple gear having an intermediate toothed portion 75 of a diameter greater than the portion 74 and adapted to receive the gear portion 62 in mesh therewith when the double gear element on the spline shaft is moved in one direction, and another portion of still larger diameter which is toothed, as at 76, to receive the gear portion 63 in mesh therewith when said double gear is moved in the opposite direction on the spline shaft, said engaged gear portions 63 and 76 giving the low or first speed drive to the gear 57 and the engaged gears 62 and 75 the intermediate or second speed.

For starting the motor, which may be of any desirable or approved internal combustion type and as designated generally by the numeral 17 in Figure 1 of the drawings, wherein the cylinder of the engine is illustrated more or less conventionally, are included the structural arrangements and operations of the parts to and including the primary driving gears 27 and 28 as already generally described. As further illustrated, more or less conventionally, the fuel intake and exhaust valve rods 77 and 77', are respectively actuated by tappets 78 and 78', which latter work in the usual guides 79 and 79' provided therefor on the casing 10, said tappets being actuated alternately by opposed crank arms 80 and 80' which are pivotally mounted within the casing 10, as at 81, and having rollers at their free ends which are held in engagement with and operated by a cam extension 82 provided on the transmission shaft 29 and working in a chamber 83 formed in the adjacent wall portion 12 of the casing and communicating with the portion of the chamber 15 in which the primary gear 28 is located.

As shown, the hub portion of the gear 28 is formed with a tapered recess in its outer end, said recess being provided with an annular series of ratchet teeth 84 for engagement with a counterpart series of teeth 85 formed on the tapered end portion of a clutch member 86 which is splined to reciprocate longitudinally on a special starter shaft to be now described.

As shown, the starter shaft, designated generally by the numeral 87, comprises two axially aligned portions 88 and 89, respectively, which are integrally connected at their inner ends by an offset including segmental end portions whose peripheral portions are formed integrally with a semi-cylindrical connecting body 91. The offset portions 90 and 91 of the starter shaft work in the chamber 55 in which the clutch release lever 53 is located, said parts 90 and 91 being spaced to afford ample clearance for the operation of the lever 53 and corresponding endwise movement of the thrust collar 51 and the clutch release rod 47. However, the opposite edge portions of the semi-cylindrical offset part 91 alternately engage the opposite sides of said clutch release lever 53 whereby to limit the rotative movement of the starter shaft to substantially one-half turn or through the angle of 180°. The outer end of the shaft portion 86 is formed square, as at 92, for the reception of a pedal crank 93 which latter is normally directed upwardly and in which position the offset portion 91 of the starter shaft is positioned under the clutch release lever 53, as shown in Figures 2 and 3.

Normally, the clutch member 86 is held out of engagement with the teeth 84 on the primary driving gear 28 by a throw-out pin 94 which is disposed diagonally in the casing closure 16 with its inner end engaged in an annular groove 95 provided in the clutch member 86. This groove has a widened portion so that after the shaft 87 has been rotated through an angle of a few degrees the clutch member 86 is free to endwise movement on the shaft towards the gear 28 under the pressure of a spring element 96 which is interposed between the outer end of said clutch member and an opposed shoulder provided on the starter shaft 87. In this connection, it is noted that the arrangement of the groove 95 of the clutch member 86 with relation to the throw-out pin 94 is such that the clutch member is disengaged from the gear 28 when the pedal crank is in either its normal upstanding position or after it has been operated and is in its vertical pendant position below the starter shaft. The throw-out pin, therefore, is effective for the positive disengagement of the clutch member 86 from the gear 28 only when the pedal crank 93 is at the limit of its stroke in either direction, the widened portion of the slot 95 being arranged so that the clutch member 86 is engaged with the teeth 84 of the gear 28 whereby the gear is rotated under the force applied to the starter shaft 87, the obvious ratchet form of the teeth 84 and 85 being such that the gear 28 may continue its rotation when the rotation of the starter shaft is stopped. A spiral spring element 93' is provided for yieldably holding the starter shaft with the pedal crank 93 in an upright position and for restoring it to such position after operation, said spring being obviously attached at its outer end to the casing and at its inner end to the shaft.

Outwardly beyond the roller bearing 24 the crank shaft member 23 is rotatable with a snug fit in the enlarged portion of a bore 97 provided in a bushing 98, which latter is fitted with leak-tight effect in the opening of the casing wall 11 in which said roller bearing 24 is located, said bushing being secured in place and held against rotation by screw elements 99 which are inserted through apertures provided therefor in the annular flange portion of the bushing and into aligned screw-threaded openings formed in the adjacent portion of the casing wall. At the outer end of the shaft member 23 is a reduced axial extension 100 which is projected through a correspondingly reduced bore provided in the bushing 98, said extension 100 having a flattened face 101 adjacent its outer end which is engaged by the roller 102 usually provided at the free end of a spring-pressed pivotal arm 103 forming part of the ignition timing device 104 which is conventionally shown in Figure 2. In this connection it is noted that the timing device 104, of itself, does not constitute any part of the present invention except as it enters generally into the operative structure. Suffice it to say the device 104 is arranged and adapted for adjustment to bring about the ignition of the fuel charge in the power cylinder 17 at the proper time.

An important feature of the present invention is the provision of breather or crank case relief means whereby gases resulting from fuel combustion within the cylinder 17 and which may possibly get by the piston rings and enter the crank case are effectively discharged from the casing on the down or firing stroke of the piston. For this purpose, the shaft member 23 is bored axially from its inner end, as at 105, the outer end of the bore terminating in a lateral port 106, which latter is brought into registration with a port 107 in the bushing 98 once during each revolution of the shaft, said port 107 being in constant communication with an exhaust opening 108 provided in the adjacent wall portion of the casing section 11, and, in practice, suitable conducting pipe 109 may be attached at its inner end to the exhaust opening 108 and lead therefrom to a remote point for the safe discharge of noxious gases taken from the crank case. For the effective operation of the breather means, the port 106 in the crank shaft member 23 and the port 107 in the bushing 98 are relatively arranged so that the port 106 moves out of registration and communication with the port 107 when the piston moves upwardly in the power cylinder 17 and remains closed until the piston starts on its downward stroke. By this provision a partial vacuum is created in both the crank and fly wheel chamber 13 and also in the transmission chamber 14, the partial vacuum being changed to a compressive effect after the piston has started down and until the port 106 has again moved into registration and communication with the port 107. In this way, not only is there ample exit for the gases in the crank and fly wheel chamber 13 whereby the engine runs smooth and clean, but the alternating vacuum and compression effect in the transmission chamber 14 facilitates the circulation of the oil throughout the lubricating system which will now be described.

As shown more clearly in Figure 1, the crank and fly wheel chamber 13 is defined by a cylindrical wall 110 which extends from the region of the end wall 111 of the casing 10 where the power cylinder 17 is attached, said cylindrical wall 110 terminating short of the top wall 112 of the casing 10 so that a restricted transverse passageway 113 is provided between said chamber 13 and the upper portion of the transmission chamber 14. While the chamber 13 is substantially closed throughout its extent except where the transverse passageway 113 is provided, the transmission chamber 14 is open to full communication throughout the extent of its lower portion with a main oil reservoir 114 which extends from the end wall 111 to the opposite end wall 115 and normally contains a body of oil which is maintained at a level approximating the line 116, said oil level being maintained below the circumferential portions of the respective transmission gears in the chamber 14, so that said gears do not normally rotate immersed in the main body of oil in the reservoir 114, but receive their lubricant in the manner which will presently more fully appear.

The chamber hereinbefore identified as the primary gear chamber, generally by the numeral 15, is divided into a restricted portion 117 which communicates with a larger portion 118, communication between said portions 117 and 118 being had in the region where the two gears 27 and 28 travel in mesh with each other, as at 119.

Inasmuch as the two gears 28 and 27 are of the same width, which is slightly less than the width of the gear chamber 15, and the toothed peripheral portions of said gears each travel close to the cylindrical wall portion of its particular sub-chamber 117 or 118, as the case may be, a rotary pump effect is attained whereby oil entering the sub-chamber 118 through a restricted tube 120 from the adjacent lower portion of the reservoir 114, is carried by the toothed peripheral portion of the gear 28 to the corresponding portion of the gear 27 on the crank shaft member 25, considerable pressure being produced in the chamber 15, and the excess pressure being relieved through a relief valve 121 having a return pipe connection 122 leading into the upper portion of the transmission chamber 14. The relief valve 121 may be of any desirable type, but, as shown, it is of the spring-pressed ball check type and communicates with the upper portion of the passageway 119 between the two chamber portions 117 and 118, as at 123.

Extending diagonally through the closure member 16 of the chamber 15 is a restricted passageway 124 through which communication is established between portion 117 of the chamber 15 adjacent the outer side of the gear 27 and a space 125 at the bottom of a bearing provided in the closure member 16 for the outer end portion 126 of the hereinbefore described crank shaft member 25.

The shaft member 25 is provided with a restricted axial bore 127 communicating at its outer end directly with the space 125 and having an angular port 128 at its inner end registering constantly in communication with a passageway 129 in the adjacent fly wheel member 22, said passageway 129 being in turn constantly in communication with a diagonal passageway 130 provided in the crank member 20.

As shown, passageway 130 in the crank member 20 discharges directly into the roller bearing 21' so that said bearing is thoroughly lubricated, the excess oil being thrown off by centrifugal force due to the rotation of the crank, including the fly wheels 22, and thereby carried around the interior peripheral portion of the chamber 13 and thence directed through the transverse passageway 113 to the upper portion of the transmission chamber 14.

The casing 10 is provided with a sub-chamber 131 in an upper extension thereof, said sub-chamber communicating with the sub-chamber 118, as at 132, and housing a driving gear 133 for the generator which is not shown but is obviously mounted on the adjacent top portion of the casing 10. Said gear 133 is in mesh with the primary driving gear 28 and as located it receives oil brought up from the lower portion of the sub-chamber 118 before the oil reaches the primary gear 27. However, the gear 133 is considerably narrower than the gear 28 and, therefore, allows the oil to be carried on the gear 28 in ample quantity to the gear 27. It is thus apparent that not only is an effective oil pumping action attained by the particular arrangement and correlation of the gears 27 and 28 but the general system is such that all the gears and moving parts requiring lubrication are automatically supplied with oil. While the essential parts are thus lubricated, the several bearings are obviously made leak-tight so as to retain the oil within the casing 10, and to prevent the clutch elements between the main transmission shaft 29 and tubular spline shaft 31 from becoming affected by the oil, a hollow oil collector and spacer cap 134 is riveted on the end flange 33 of the spline shaft. Leading from the collector or spacer cap 134 into a larger collector 135 located outside of the clutch support 32 is a drain opening 136. By this provision such small quantity of oil that may seep into the collector or spacer cap 134 is discharged into the external collector 135 which is of ample capacity to take care of all oil seepage at this point.

While the structure illustrated embodies a practical adaptation of the invention, it is obvious that considerable modification may be made within the spirit of the invention as defined by the appended claims. The invention, therefore, is not limited to the specific construction and arrangements shown in the accompanying drawings.

What is claimed is:

1. A unitary mechanical assembly for the purpose indicated, comprising a casing, a crank shaft mounted in said casing, a main transmission shaft mounted in the casing in laterally opposed parallel relation to the crank shaft, a tubular spline shaft sleeved to rotate on said main transmission shaft but immovable longitudinally thereof, releasable clutch means interposed between adjacent ends of said main transmission shaft and said spline shaft, a transverse ratio driving connection between said crank shaft and said main transmission shaft, a driving gear sleeved on said spline shaft and normally free of rotative connection therewith, a unitary stepped multiple idler gear mounted in the casing to rotate about an axis in parallel relation to the common axis of said main transmission shaft and the spline shaft thereon, one of the stepped portions of said idler gear being constantly in mesh with the driving gear on the spline shaft, and a unitary speed change gear stepped reversely to said idler gear and mounted to slide longitudinally on said spline shaft but rotatable therewith, said speed change gear being of a proportionate length whereby, in one of its positions between the steps of the idler gear not engaged with the driving gear on the spline shaft, to be out of engagement with said idler gear but being shiftable to different positions to alternately engage the stepped portions of said idler gear not engaged by said driving gear and having a clutch portion at its end for direct engagement with a corresponding clutch portion of said driving gear when shifted to another position free of engagement with said idler gear.

2. A mechanism for the purpose indicated, comprising a casing, a crank shaft mounted in said casing, transmission means including a main drive shaft mounted in the casing parallel with and in laterally opposed relation to the crank shaft and having a driving connection therewith, a tubular spline shaft sleeved to rotate on said drive shaft but immovable longitudinally thereof, both of said shafts extending at one end outside of the casing, the projected end portions of said shafts carrying opposed cooperative clutch elements thereon in normal engagement whereby the one shaft is rotated by and with the other, declutching means carried by said main drive shaft for disengaging said clutch elements at the will of the operator, a drive gear sleeved on said spline shaft and normally rotatable independently thereof, and variable speed means for driving said drive gear including a unitary stepped multiple idler gear mounted in the casing to rotate about an axis in parallel relation to the common axis of said main transmission shaft and the spline shaft thereon, said idler shaft having one of its stepped portions constantly in mesh with the drive gear on the spline shaft, and a unitary speed change gear stepped reversely to said idler gear and mounted to slide longitudinally on said spline shaft but rotatable therewith, said speed change gear being of a proportionate length so as to be positioned neutrally between the stepped portions of said idler gear not engaged directly with said drive gear and being shiftable in opposite directions to different positions whereby to alternately engage the stepped portions of said idler gear not engaged directly with said drive gear, said speed change gear having clutch provision at its end for direct engagement with corresponding provision on the adjacent end of the drive gear when shifted to another position free of engagement with said idler gear.

3. The mechanism set forth in claim 2 and further describing the declutching means as more specifically including an actuator rod extended through an axial bore in the main drive shaft and provided at one end with an operator element for engaging one of the clutch elements to disengage the same from the other clutch element and said actuator rod being provided at its opposite end with means for effecting longitudinal reciprocation of the rod at the will of the operator.

MARK W. ANTHONY.